United States Patent
Okamoto

(10) Patent No.: US 7,847,525 B2
(45) Date of Patent: Dec. 7, 2010

(54) THERMAL PROTECTION OF CONTROLLER FOR ON-VEHICLE ALTERNATORS

(75) Inventor: Nobuhito Okamoto, Chiryu (JP)

(73) Assignee: Denso Corporation, Kariya (JP)

( * ) Notice: Subject to any disclaimer, the term of this patent is extended or adjusted under 35 U.S.C. 154(b) by 526 days.

(21) Appl. No.: 11/896,575

(22) Filed: Sep. 4, 2007

(65) Prior Publication Data
US 2008/0067983 A1    Mar. 20, 2008

(30) Foreign Application Priority Data
Sep. 1, 2006    (JP) ............... 2006-238003

(51) Int. Cl.
H02P 11/00    (2006.01)
H02P 9/00    (2006.01)
(52) U.S. Cl. .......................... 322/33; 322/44
(58) Field of Classification Search .......... 322/33, 322/25, 19, 28, 24, 44
See application file for complete search history.

(56) References Cited

U.S. PATENT DOCUMENTS

| | | | | |
|---|---|---|---|---|
| 4,470,003 A | * | 9/1984 | Mitchell | 322/23 |
| 5,160,881 A | * | 11/1992 | Schramm et al. | 322/7 |
| 5,323,062 A | * | 6/1994 | Crawford et al. | 307/125 |
| 6,802,185 B2 | * | 10/2004 | Furukawa et al. | 62/89 |
| 6,812,675 B2 | * | 11/2004 | Okamoto et al. | 322/28 |
| 6,995,544 B2 | | 2/2006 | Sumimoto et al. | |
| 7,256,371 B2 | * | 8/2007 | Crawford et al. | 219/494 |
| 2001/0050855 A1 | * | 12/2001 | Aiello et al. | 363/50 |
| 2004/0016246 A1 | * | 1/2004 | Furukawa et al. | 62/183 |
| 2008/0074087 A1 | * | 3/2008 | Oshima et al. | 322/34 |

FOREIGN PATENT DOCUMENTS

JP    2003-009307 A    1/2003
JP    A-2004-357428    12/2004

OTHER PUBLICATIONS

Notification of Reasons for Rejection with English-language Translation for Appln. No. 2006-238003, mailed Jun. 29, 2010.

* cited by examiner

Primary Examiner—Julio Gonzalez
(74) Attorney, Agent, or Firm—Oliff & Berridge, PLC

(57) ABSTRACT

A thermal protecting circuit is provided for an alternator controller. The protecting circuit comprises a switching member switching on/off the alternator; a sensor sensing a temperature of the switching member; and a switching control circuit. This switching control circuit switches off the switching member when the temperature of the switching member exceeds a first predetermined temperature. This switching control circuit switches on the switching member when the temperature of the switching member is lower than a second predetermined temperature. The second predetermined temperature is set to be higher than the first predetermined temperature.

9 Claims, 6 Drawing Sheets

| PARAMATERS / TEMPERATURE REGION | Vref (OUTPUT OF TEMPERATURE COMPENSATION SETTING CIRCUIT) | Vset (OUTPUT OF LIMITTER) | ON-DUTY RATIO OF Vs (OUTPUT OF PWM SIGNAL GENERATOR) |
|---|---|---|---|
| LOW TEMPERATURE REGION (TVT < TPL) | < VrefL (corresponding to the low-control temperature TPL) | HIGH TARGET VOLTAGE VsetH (14.5V) (USUAL) | (1) CONVENTIONAL |
| INTERMEDIATE TEMPERATURE REGION (TPL < TVT < TPH) | > VrefL AND <VrefH | HIGH TARGET VOLTAGE VsetH (14.5V) AND LOW TARGET VOLTAGE VsetL (13.0V) | (2) DECREASED THAN (1) ((2) < (1)) |
| HIGH TEMPERATURE REGION (TPH < TVT) | < VrefH (corresponding to the high-control temperature TPH) | LOW TARGET VOLTAGE VsetL (13.0V) (LOWER THAN USUAL) | (3) DECREASED THAN (2) ((3) < (2)) |

NORMAL HYSTERESIS CONTROL
(Tdeactivate < Tactivate)
PRIOR ART

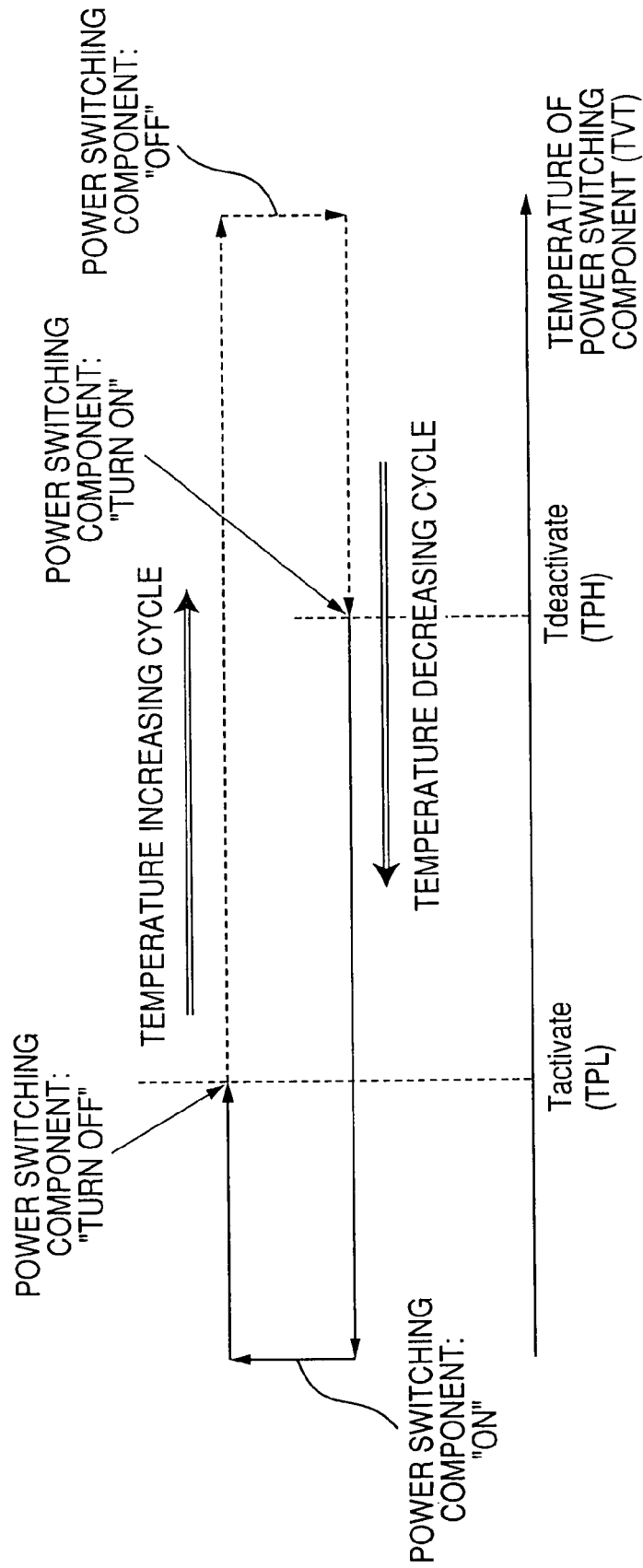

FIG. 5

| PARAMETERS<br>TEMPERATURE REGION | Vref (OUTPUT OF TEMPERATURE COMPENSATION SETTING CIRCUIT) | Vset (OUTPUT OF LIMITTER) | ON-DUTY RATIO OF Vs (OUTPUT OF PWM SIGNAL GENERATOR) |
|---|---|---|---|
| LOW TEMPERATURE REGION (TVT < TPL) | < VrefL (corresponding to the low-control temperature TPL) | HIGH TARGET VOLTAGE VsetH (14.5V)<br><br>(USUAL) | (1) CONVENTIONAL |
| INTERMEDIATE TEMPERATURE REGION (TPL < TVT < TPH) | > VrefL AND < VrefH | HIGH TARGET VOLTAGE VsetH (14.5V) AND LOW TARGET VOLTAGE VsetL (13.0V) | (2) DECREASED THAN (1)<br><br>((2) < (1)) |
| HIGH TEMPERATURE REGION (TPH < TVT) | < VrefH (corresponding to the high-control temperature TPH) | LOW TARGET VOLTAGE VsetL (13.0V)<br><br>(LOWER THAN USUAL) | (3) DECREASED THAN (2)<br><br>((3) < (2)) |

THERMAL PROTECTION OF CONTROLLER FOR ON-VEHICLE ALTERNATORS

CROSS-REFERENCE TO RELATED APPLICATION

This application is based on and claims the benefit of priorities from earlier Japanese Patent Application No. 2006-238003 filed on Sep. 1, 2006, the description of which is incorporated herein by reference.

BACKGROUND OF THE INVENTION

1. Technical Field of the Invention

The present invention relates to an apparatus for thermally protecting a controller for on-vehicle alternators, and in particular, to the apparatus for protecting the controller from heat generated from a switching circuit incorporated in the controller.

2. Related Art

A power switching device is incorporated in a variety of types of machines, and one type of such a device is an excitation-current control apparatus (called "regulator") for an alternator mounted in a vehicle. Such a power switching device needs fast switching operations, thereby generating a large amount of heat. Thus, the power switching device is subjected to a rise in its temperature when an ambient temperature is higher or when a cooling apparatus cooling down the power switching device does not work well.

To measure the above heat generation, it is usual that thermal protection control is executed to suppress heat generated from power switching components. This thermal protection control is carried out by detecting the temperature of the power switching components, and limiting an electric current passing through the components (i.e., activating a current-limiting operation) when the detected temperature exceeds an activating threshold temperature $T_{activate}$. In contrast, this current-limiting operation is deactivated when the detected temperature becomes lower than a deactivating threshold temperature $T_{deactivate}$. This deactivating threshold temperature is set to be lower than the activating threshold temperature.

It is normal that the current-limiting operation is performed by turning off the power switching components. Alternatively the current-limiting operation may be performed by effective current control (e.g., on-duty ratio control of the power switching components) to keep the target effective current, passing through the components, lower than a predetermined average current.

This thermal protection control is proposed by, for instance, U.S. Pat. No. 6,995,544, which is widely employed by conventional power switching devices composed of power switching components which are required to operate within a strictly restricted temperature range.

However, as mentioned above, in the conventional thermal protection control, the deactivating threshold temperature at which the current-limiting operation is deactivated is set lower than the activating threshold temperature at which the current-limiting operation is activated. That is, the conventional thermal protection control can be called "normal hysteresis control (refer to FIG. 4A)." Further, the activating threshold temperature is usually set to an uppermost temperature, so that in a temperature range up to the uppermost temperature the components are assured to operate without malfunction.

Under this combination of the activating and deactivating threshold temperatures, in the temperature decreasing cycle, the power switching components keep their turned-off states until the detected temperature of the components becomes lower than the deactivating threshold temperature, although the components are able to already operate without malfunction in a temperature range from the activating threshold temperature down to the deactivating threshold temperature.

In other words, the power switching components are not turned on until the detected temperature of the components or the device reaches the deactivating threshold temperature which is set at the uppermost temperature, thus being laid idle in the temperature range between the activating and deactivating threshold temperatures. In the temperature range between the activating threshold temperature $T_{activate}$ and the deactivating threshold temperature $T_{deactivate}$, the components can operate normally but lays idle. Resultantly, in the temperature decreasing cycle, the cumulative output of the alternator is reduced.

On the contrary, considering when the power switching component turns off (i.e., when the current-limiting operation is activated; in the temperature increasing cycle), the power switching component is not turned off until the detected temperature of the component reaches the uppermost temperature (i.e., the activating threshold temperature $T_{activate}$ in the normal hysteresis control), thereby experiencing a relatively severe temperature environment.

Additionally, there is a drawback that the output current of the alternator is abruptly changed when the power switching component is turned on/off in executing the current-limiting control. Concurrently, when this abrupt change in the output current occurs, a mechanical impulse (i.e., a torque shock) affecting the engine occurs. This impulse is caused by abrupt torque changes of the alternator when the component controlling an excitation current of the alternator turns on/off in the regulator.

Further, to suppress the thermal generation at the power switching component, the conventional thermal protection control, which is performed by the regulator, operates to lower the threshold voltage of the component by 1 or 2 volt depending on the output voltage of the battery, when the temperature of the regulator exceeds the activating threshold temperature so as to reduce the ON-duty current passing the component.

After this, the changed threshold voltage is returned to an initial threshold voltage before executing the above operation, when the temperature of the regulator is lower than the deactivating threshold temperature. This recovery control increase an additional ON-duty current passing the component, which increases an additional torque of the alternator, thus accelerating the torque shock.

SUMMARY OF THE INVENTION

The present invention has been made in light of these problems in the conventional art, and has an object of suppressing changes in the output current from the on-vehicle alternator, while still being able to effectively limit the output current for thermal protection.

In order to achieve the object, there is provided a thermal protecting circuit for an alternator controller. The circuit comprises a switching member switching on/off the alternator; a sensor detecting a temperature of the switching member; and a switching control circuit switching off the switching member when the temperature of the switching member exceeds a first predetermined temperature, while switching on the switching member when the temperature of the switching member is lower than a second predetermined temperature, the second predetermined temperature being set to be higher than the first predetermined temperature.

It is preferred that the circuit further comprises a switching circuit comprising the switching member and a circular diode connected between an output terminal of the alternator and a terminal of the switching member, wherein the sensor senses a temperature of the switching circuit.

It is also preferred that the second predetermined temperature is substantially equal to an upper limit of a temperature range within which the switching member is assured to be able to operate without malfunction.

It is also preferred that the first and the second temperature are set so that the detected temperature can be maintained by the thermal protection circuit between the first and the second temperature when an ambient temperature around the switching member and a heat generated by the switching member are an expected maximum temperature and an expected maximum heat, respectively.

BRIEF DESCRIPTION OF THE DRAWINGS

A preferred form of the present invention is illustrated in the accompanying drawings in which:

FIG. 4B shows "reverse hysteresis control" used in thermal protection control of the present invention; and FIG. 5 shows a table explaining a parameter setting summary of various parameters used in each operation mode of an excitation-control-signal generation circuit of an embodiment.

DETAILED DESCRIPTION OF PREFERRED EMBODIMENT

Referring to FIGS. 1-5, an embodiment of the present invention will now be described.

Figure 1:
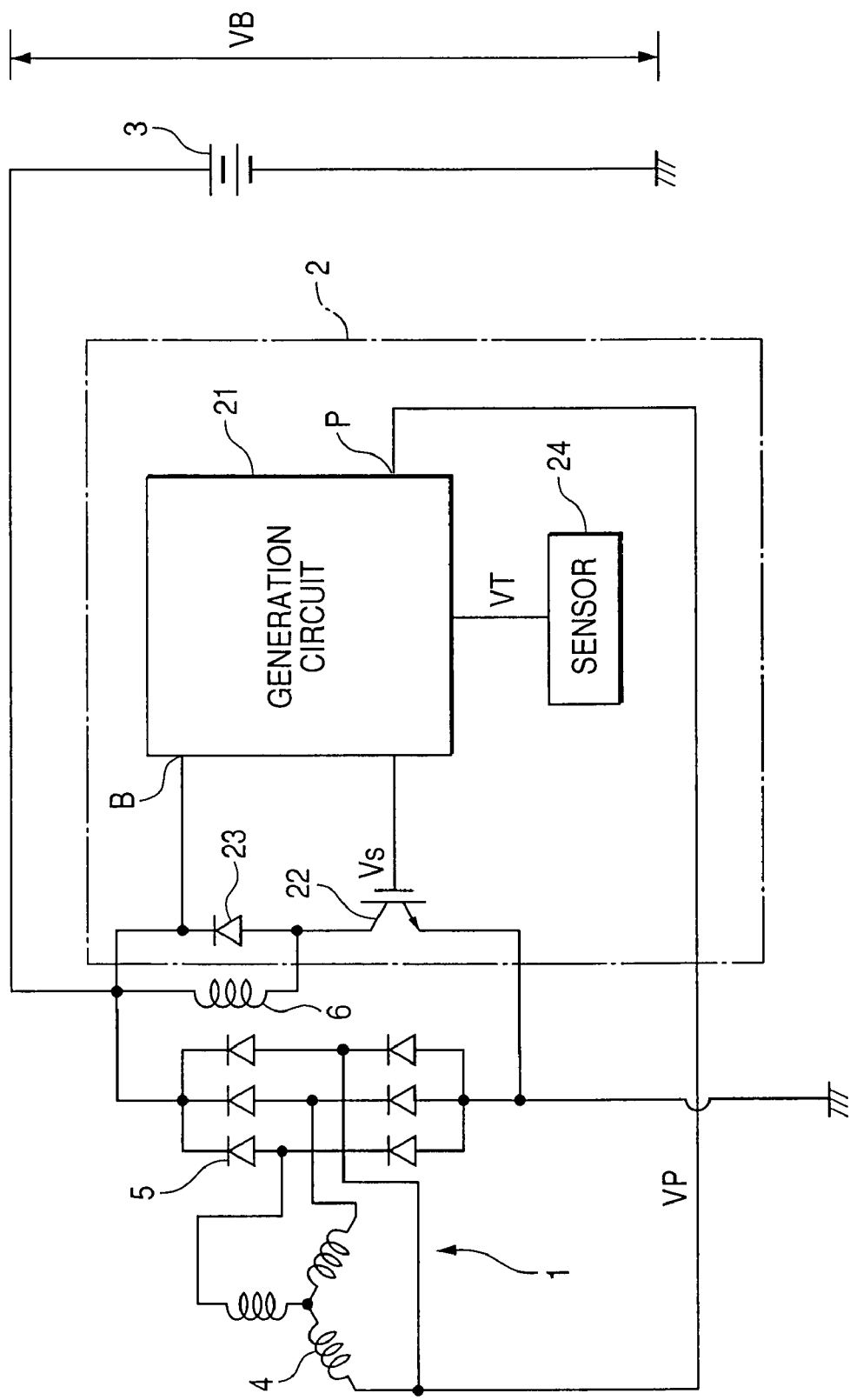
FIG. 1 is a circuit diagram showing an on-vehicle alternator adopting thermal protection control according to an embodiment of the present invention.

First, the general arrangement of an on-vehicle alternator will now be described using FIG. 1. FIG. 1 is a schematic electric circuit of an alternator to be mounted on a vehicle and peripheral circuits such as a controller thereof.

This on-vehicle alternator is composed of an alternator 1 driven by an engine of the vehicle (not shown), a regulator 2 (also referred to as an excitation-current control device or a switching control circuit) controlling generated states of the alternator 1, and an on-vehicle battery 3 electrically connected to the alternator 1 and the regulator 2.

The alternator 1 comprises a three-phase armature coil 4 whose components are star-connected to each other and are wound around a stator core (not shown), a three-phase full-wave rectifier 5, and an excitation coil 6.

Generated current by each phase coil of the armature coil 4 is rectified by the rectifier 5, and then supplied to the battery 3.

Figure 2:
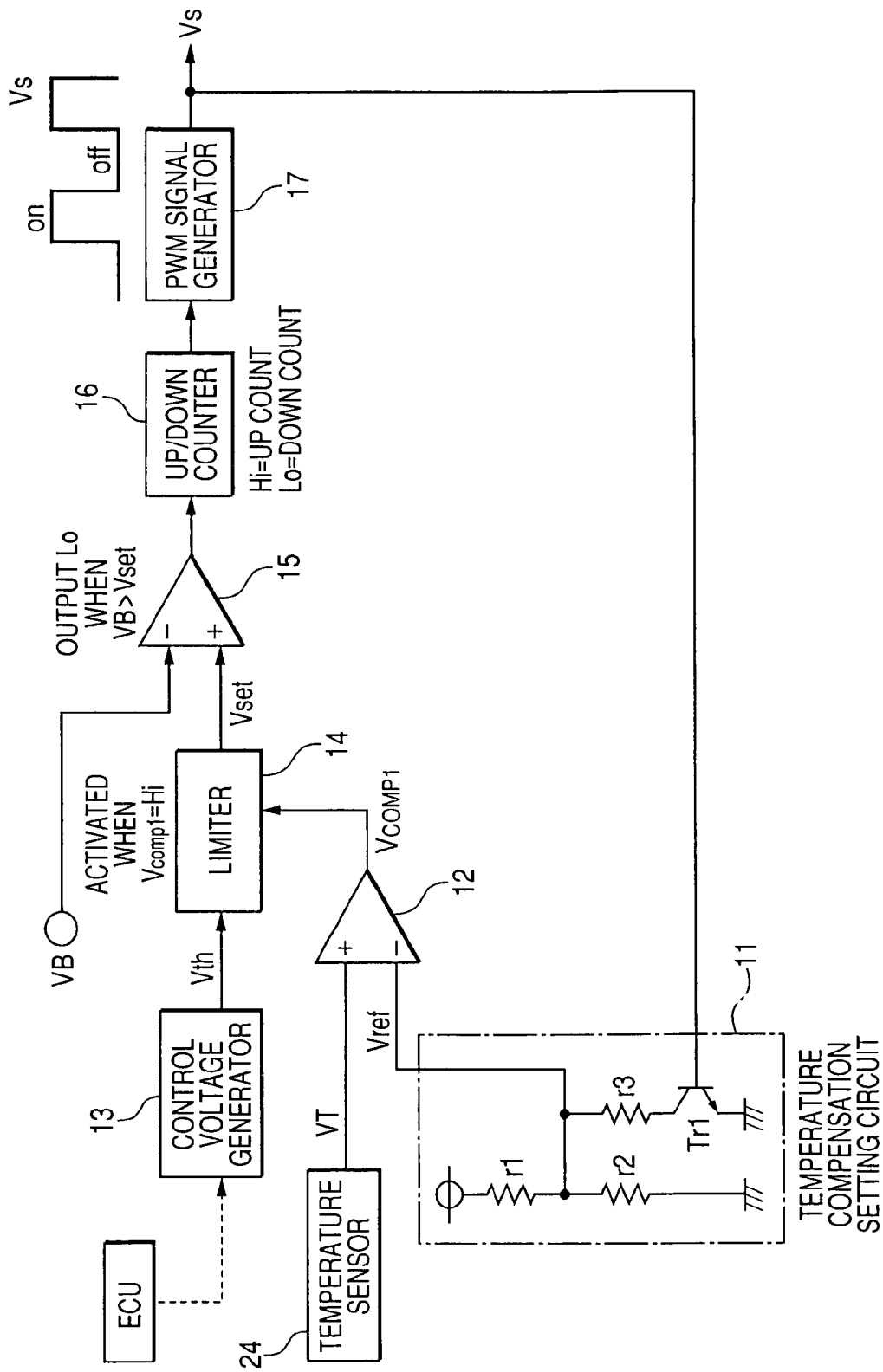
FIG. 2 shows an example an excitation-current-control signal generation circuit shown in FIG. 1.

The regulator 2 will now be detailed using FIG. 2.

The regulator 2 composes an excitation-control-signal generation circuit 21, an excitation-current control transistor 22 (also referred to as a switching member) which also serves as a power switching component, a fly wheel diode 23, and a temperature sensor 24.

As noticed from descriptions below, the regulator 2 allows the excitation-current control transistor 22 to be built therein, so that the circuit configuration of the regulator 2 becomes simple.

As is well known, based on a comparing result between a battery voltage VB and a control voltage Vset (described latter) which is set in advance, the regulator 2 adjusts an on-duty ratio of an imposed PWM voltage Vs to the transistor 22 so as to decrease the on-duty ratio if the battery voltage VB is higher than the control voltage Vset and increase the on-duty ratio if the control voltage Vset is lower than the battery voltage VB.

The regulator 2 also controls the excitation current based on a phase voltage VP (representing a revolving state of the engine), which is an output voltage generated by each phase of the three-phase armature coil 4, and a temperature signal voltage VT detected by the sensor 24 included in the regulator 2.

Specifically, for example, the alternator 1 is controlled to start generating, when a detected voltage VP exceeds a predetermined voltage (corresponding to a predetermined revolving state of the engine).

For another example, the on-duty ratio of the excitation current control is performed based on the voltage VT. For instance, when the voltage VT exceeds a reference voltage Vref, a maximum value of the on-duty ratio of the transistor 22 is made to decrease so as to prevent the transistor 22 from raising the temperature thereat any more. On the other hand, when the voltage VT is lower than the reference voltage Vref, the on-duty ratio of the transistor 22 is made to increase so that the output excitation current is increased.

This kind of excitation current controller is well known in its circuit arrangement, operation and various variations thereof.

An exemplary configuration of the excitation-control-signal generation circuit 21 (also serves as a switching-control circuit) will now be detailed together with FIG. 2.

This generation circuit 21 is composed of a temperature-compensation setting circuit 11, a comparator 12, a control-voltage generating circuit 13, a control-voltage limiter 14, a comparator 15, an up/down counter 16, and a PWM (Pulse Wave Modulation) signal generating circuit 17, in addition to other components (not shown), such as amplifiers to drive various not-shown devices.

The control-voltage generating circuit 13 generates a predetermined control-signal voltage Vth by using, for example, a constant-voltage diode. In this embodiment, the voltage Vth is set to 14.5V.

Alternatively, instead of generating the voltage Vth therein, the circuit 13 may receive a signal representing the voltage Vth from an external device, e.g., an ECU (Electronic Control Unit) and output the voltage Vth.

A temperature sensor 24 is mounted on a board on which the excitation-control-signal generation circuit 21 is implemented. The sensor 24 includes a temperature detecting circuit. The detecting circuit uses a thermistor and is positioned near to the transistor 22 on the board. The temperature sensor 24 outputs a temperature signal voltage VT which is substantially in proportion to a detected temperature by the detecting circuit, and is supplied to the comparator 12.

The temperature-compensation setting circuit 11 generates the threshold voltage Vref which is supplied to the comparator 12. This circuit 11 is able to generate, as the above voltage Vref, two kinds of threshold voltage, i.e., a voltage VrefH (as a HI(high)-level signal) and a voltage VrefL (as a LO(low)-level signal).

The temperature-compensation setting circuit 11 generates and outputs the voltage VrefH, only when an excitation control signal voltage Vs, which is generated by the PWM signal generator 17 described in detail later, is high (namely, only after the transistor 22 is turned on), while outputs the voltage VrefL, only when the voltage Vs is low (namely, only after the transistor 22 is turned off).

In order to achieve the above functions, the temperature compensation setting circuit 11 can be implemented by means of a control-signal generating program (which locating in the ECU, calculating the voltage Vref based on the voltage Vs, and outputting the calculated voltage Vref together with D/A and A/D converters and necessary drivers, a digital circuit, or an analog circuit. However, the analog circuit described below has a simple arrangement, thus being preferable.

As shown in FIG. 2, the circuit 11 is composed of a resistor r1, a resistor r2, a resistor r3, and a transistor Tr1. Where the resistor r1 is connected to a constant-voltage power supply, the resistor r1 is also connected in series to the resistor r2 on the opposing side connected to the power supply, whereby these resistors r1 and r2 constitute a voltage divider. Further, the resistor r3 and the transistor Tr1 are connected in series to each other, the resistor r3 is connected in parallel to the resistor r2 on the opposing side connected to the transistor Tr1, whereby the resistor r3 and the transistor Tr1 cooperatively constitute the switching circuit for the output Vref.

As shown FIG. 2, the temperature compensation setting circuit 11 is configured so that the output thereof Vref is high when the input thereof is high (the transistor Tr1 is turned on), while the output Vref is low when the input thereof is low (the transistor Tr1 is turned off). As easily anticipated, this transistor Tr1 can be replaced with any other switching device, e.g., bipolar transistors, with proper rearrangements of peripheral components therearround (i.e., the resistor r1, r2, and so on).

In this embodiment, the transistor Tr1 is controlled by the excitation control signal voltage Vs supplied from the PWM signal generator 17. Specifically, the temperature-compensation setting circuit 11, including the transistor Tr1, outputs the high-level threshold voltage VrefH when the input Vs supplied thereto is high (the transistor Trn is turned on), while the circuit 11 outputs the low-level threshold voltage VrefL, when the input Vs supplied thereto is low (the transistor Tr1 is turned off).

In this way, the circuit 11 is configured to switch the output voltage Vref by means of selectively turning on and off the transistor Tr1 based on the input signal supplied from the PWM signal generating circuit 17.

According to the above Vref switching executed by the circuit 11, the circuit 11 outputs the high-level threshold voltage VrefH only after the transistor 22 is turned on (i.e., when the excitation control signal voltage Vs is high), while the circuit 11 outputs the low-level threshold voltage VrefL only after the transistor 22 is turned off (i.e., when the excitation control signal voltage Vs is low).

Incidentally, in this circuit arrangement, temperature and voltage can be mutually converted based on a relationship between the detected temperature and the output signal voltage presented by the temperature sensor 24.

Figure 3:
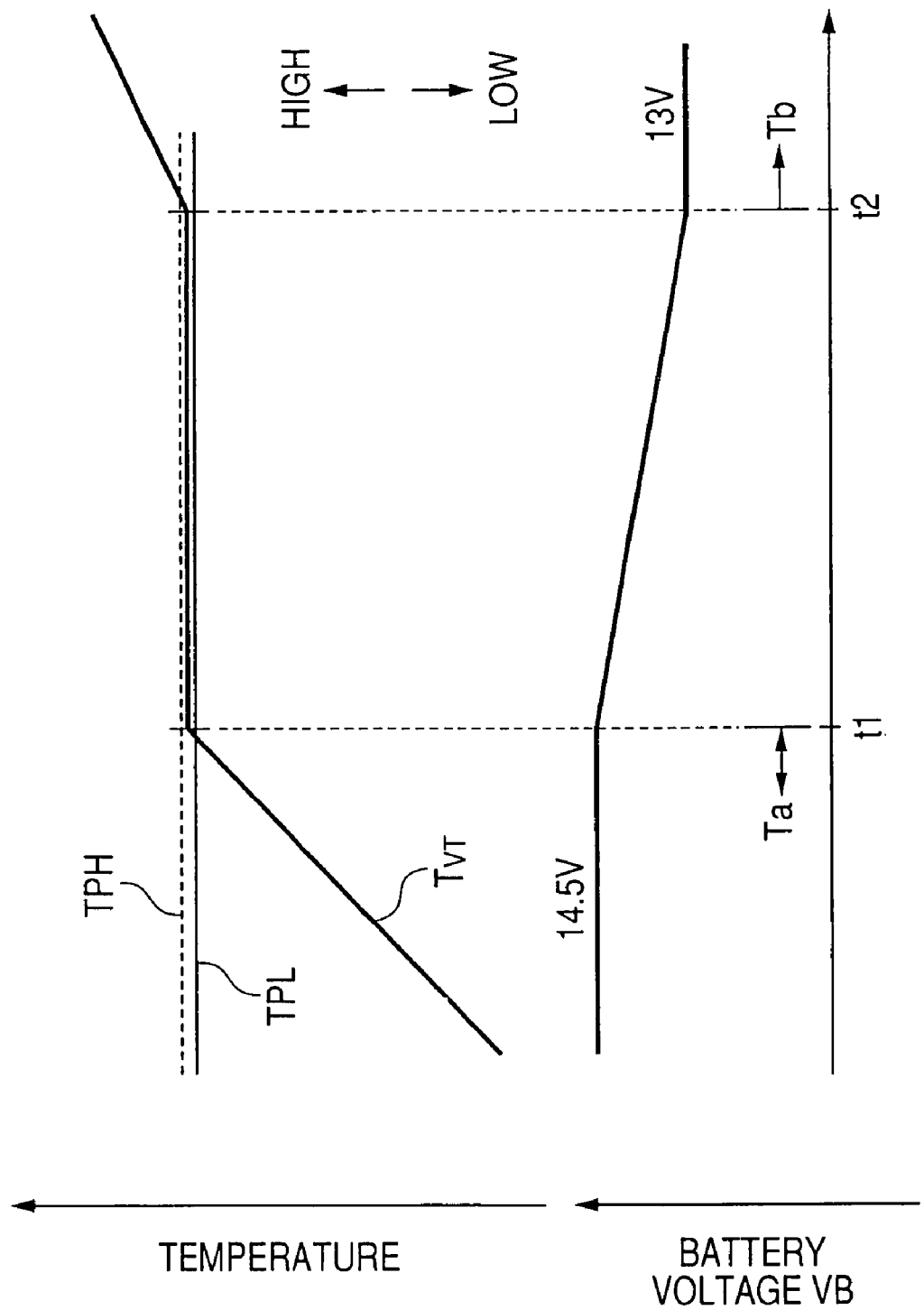
FIG. 3 is a timing chart showing temporal variations in a battery voltage and temperature of a power switching component.
Figure 4A:
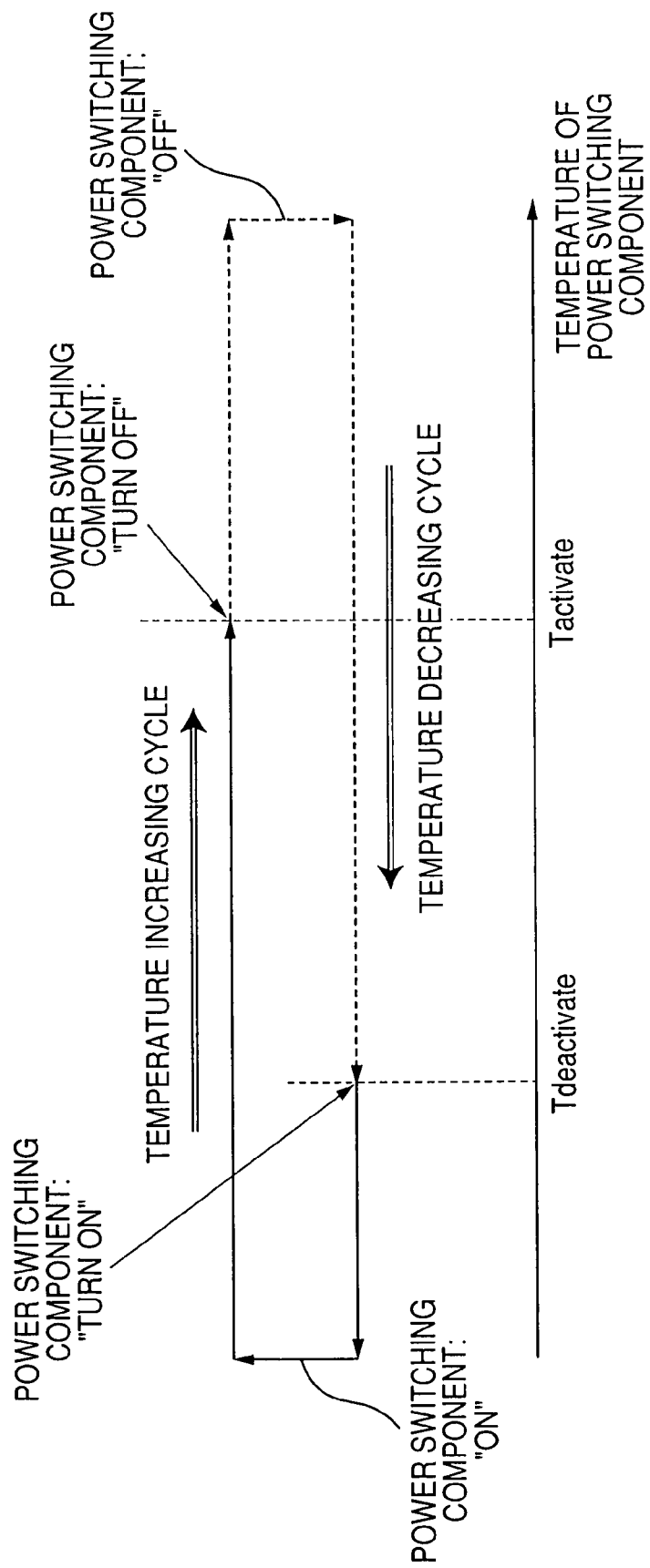
FIG. 4A shows "normal hysteresis control" used in conventional thermal protection control.

As shown in FIG. 3, the threshold voltage Vref is set so that the voltage VrefL corresponds to the temperature TPL at which the current limit operation is activated and the voltage VrefH corresponds to the temperature TPH at which the current limit operation is deactivated. Here, the temperature TPH is higher than the temperature TPL.

Further, the temperatures TPH and TPL are preferably chosen, the reason of which is as follows. In the temperature protection control, the control is maintained so that the controlled temperature resides between the temperatures TPH and TPL, even if the ambient temperature around the switching component and generated heat by the switching component reaches are active in raising the temperature up to their expected maximum values. In this way, a temperature interval between the temperature TPH and TPL is decided to be a preferable predetermined value.

This combined choice of the temperatures TPH and TPL enables the output current of the alternator to smoothly change when activating/deactivating the current-limiting operation of the thermal protection control.

However, it generally seems that the above Vref setting, in which the deactivating temperature $T_{deactivate}$ (TPH) is higher than the activating temperature $T_{activate}$ (TPL), incurs so called "hunting phenomena." That is, the thermal protection control very frequently repeats switching operations in a short time period. Actually, in this embodiment, the thermal protection control repeats frequent switching operations to some extent in a short time period.

Although this hunting-like phenomenon occurs, this phenomenon does not cause a severe failure, because of response delay caused by the thermal resistance and thermal capacitance resulting from the path from the power switching component to the detecting portion. Additionally, the power switching component is usually connected in parallel to the fly wheel diode (circular diode), whereby the output current of the alternator is not cut down so fast when the power switching component is turned off.

Conversely, a proper response delay, i.e., just above mentioned thermal conduction delay and/or switching response delay, is required to protect from fatal hunting phenomenon occurrence. As mentioned just above, the proper response delay is normally secured under usual circuit arrangements.

As explained above, the above Vref setting, that is, the deactivating temperature TPH is higher than the activating temperature TPL, does not bring about the hunting phenomena.

As described above, the switching transistor 22 is PWM-controlled. Hence, the thermal protection control is activated when the transistor 22 is turned off, while deactivated when the transistor 22 is turned on. This allows the switching transistor 22 to reduce unnecessary switching, being protected from the hunting phenomenon.

Moreover, as the deactivating temperature TPH is chosen to be higher than the activating temperature TPL, the thermal protection control ("reverse hysteresis type" of control in the present embodiment (refer to FIG. 4B)) deactivates (i.e., stop limiting the current of the transistor 22) when the detected temperature of the transistor 22 (and/or the regulator 2) becomes lower than the deactivating temperature TPH. Therefore, in the temperature decreasing cycle, a total output of the alternator can be increased relative to an alternator with the conventional thermal protection control ("normal hysteresis type" of control (refer to FIG. 4A)).

On the contrary, when the power switching component turns off (i.e., when the current-limiting operation is activated; in the temperature increasing cycle), the power switching component 22 is turned off when the detected temperature TVT of the component reaches the activating threshold temperature $T_{activate}$ (TPL) in the reverse hysteresis control. This activating threshold temperature TPL ($T_{activate}$) is set to be surely lower than the uppermost temperature of the power switching component 22, under which temperature the power switching component can be normally operable and to which the deactivating threshold temperature TPH ($T_{deactivate}$) is preferably set, thereby experiencing a relatively light temperature environment compared with conventional normal hysteresis control.

The comparator 12 outputs a high-level signal, when the temperature signal voltage VT is higher than the threshold voltage Vref, and otherwise outputs a low-level signal.

The voltage limiter 14 outputs a control voltage VsetL (13 V in this embodiment), which is set lower than, by a predetermined voltage (1.5 V in this embodiment), the threshold voltage Vth, which is fed from the control voltage generating circuit 13 to the comparator 15 when the output of the comparator 12 is high-level. The voltage limiter 14 also outputs a control voltage VsetH (14.5 V in this embodiment), which is set equal to the threshold voltage Vth, which is fed from the control voltage generating circuit 13 to the comparator 15, when the output of the comparator 12 is low-level.

A comparator 15 controls the count ratio of the counter 16 based on the comparison result between the battery voltage VB and the control voltage Vset supplied thereto from the limiter 14. The comparator 15 commands the up/down counter 16 to up-count the values when the voltage VB is lower than the voltage Vset, otherwise, the comparator 15 commands the up/down counter 16 to down-count the values. The up/down counter 16 feeds its count to the PWM signal generating circuit 17.

Note that the reference voltage Vref, which is fed to the comparator 12, is set to VrefH after the transistor 22 is turned on, and to VrefL after the transistor 22 is turned off. Here, the voltage Vref is compared with the detected temperature sensed by the temperature sensor 24, in which VrefH and VrefL correspond to the temperatures TPH and TPL, respectively.

In a case where the temperature TVT (corresponding with the temperature signal voltage VT) remains between the temperature TPL (for activating the thermal protection control) and the temperature TPH (for deactivating the thermal protection control), the comparator 12 turns off the limiter 14 after the transistor 22 is turned on, while the comparator 12 turns on the limiter 14 after the transistor 22 is turned off.

That is, in a case where the temperature TVT (corresponding with the VT) remains between the temperature TPL and the temperature TPH, the comparator 15 has two threshold voltages, i.e., the voltage VsetH and the voltage VsetL. The voltage VsetH (14.5 V) is used to turn off the transistor 22, while the voltage VsetL (13 V) is used to turn on the transistor 22.

The PWM signal generating circuit 17 generates a PWM signal having on-duty ratio corresponding to the count from the counter 16, and feeds this PWM signal as the excitation current control voltage Vs to the transistor 22 via an amplifier (not shown). In this way, the on-duty ratio of the excitation current is determined based on the battery voltage VB and the detected temperature TVT of the power switching component.

It should be noted that, as described above, the switching circuit 2 performs the feed-back control to decrease the on-duty ratio, when the battery voltage VB is higher than the threshold voltage Vset, while increasing the on-duty ratio, when the battery voltage VB is lower than the threshold voltage Vset. In this feed-back control, the current-limiting circuit 14 performs the Vset-switching so as to substantially lower the threshold voltage Vset, when the detected temperature TVT exceeds the temperature TPL, while substantially raises the threshold voltage Vset, when the detected temperature TVT becomes lower than the temperature TPH.

In this way, the abrupt changes in the alternator torque caused by the switching operations of the transistor 22 can be suppressed with no complexity of the circuit configuration.

Operations of the excitation-control-signal generation circuit 21 (i.e., the switching control circuit) will now be described with reference to FIGS. 2 and 3. Additionally, FIG. 5 shows the summary of parameter setting of parameters, i.e., above mentioned Vref, Vset, and on-duty ratio of Vs in each operation mode (i.e., operation temperature region).

(In Low Temperature Region)

In FIG. 3, this low temperature region is depicted as a time region Ta which is defined before a timing point t1.

In this case where the detected temperature TVT of the power switching component 22 is relatively low, specifically, lower than the low-control temperature TPL (corresponding to the low reference voltage VrefL), the comparator 12 outputs the low-level signal. Therefore, the limiter 14 remains in an inactive state until the input thereto supplied from the comparator 12 is high. In this case, the target voltage Vset is not limited and set to the usual target voltage VsetH (14.5 V).

In this way, in low temperature region, the target voltage Vset of the battery 3 remains in the usual target voltage VsetH (14.5 V). Hence, in this low temperature case, the circuit 21 performs a normal excitation current control.

(In Intermediate Temperature Region)

In FIG. 3, this intermediate temperature region is found as a time region between timing point t1 and t2.

In this case where the detected temperature TVT of the power switching component 22 is higher than the lower-control temperature TPL (corresponding to the low reference voltage VrefL) and lower than the higher-control temperature TPH (corresponding to the high reference voltage VrefH), the comparator 12 outputs the high-level signal.

Here, it is assumed that the battery voltage VB remains at about the normal target voltage VrefH (14.5 V) under the battery voltage regulating control by the regulator 2.

As described above, in this intermediate temperature region, the target voltage Vset has two target voltages. One is the high target voltage VsetH and the other is the low target voltage VsetL. The high target voltage VsetH (14.5 V) is the target voltage used to turn off the transistor 22. The low target voltage VsetL (13 V) is the target voltage used to turn on the transistor 22.

In this target voltage (Vset) design, the target voltage Vset is set to the low target voltage VsetL (13 V) after the transistor 22, for the purpose of the excitation current control, is turned on. On the other hand, the battery voltage VB is assumed to remain at about the normal target voltage VrefH (14.5 V), the comparator 15 outputs the low-level signal after the transistor 22 is turned on, whereby the counter 16 performs a down count, then the PWM signal generating circuit 17 outputs the excitation current control voltage Vs which has a decreased on-duty ratio.

As is the same as in the above low temperature region, the target voltage Vset is set to the high target voltage VsetH (14.5 V) after the transistor 22 is turned off.

When the battery voltage VB is lower than the high target voltage VsetH (14.5 V), the comparator 15 outputs a high-level signal Hi, the counter 16 performs an up count, and finally the excitation current control voltage Vs, which has an increased on-duty ratio, is outputted from the circuit 17.

On the other hand, when the battery voltage VB is higher than the high target voltage VsetH (14.5 V), the comparator 15 outputs a low-level signal Lo, the counter 16 performs an down count, and finally the excitation current control voltage Vs, which has a decreased on-duty ratio, is outputted from the circuit 17. In this way, the on-duty ratio of the excitation current control voltage Vs repeats changes thereof between increased and decreased.

However, in this intermediate temperature region, the target voltage Vset has two target voltages, i.e., the high target voltage VsetH (14.5 V) and the low target voltage VsetL (13 V). That is, there is a time interval where the target voltage Vset is the low target voltage VsetL (13 V), while, as described in the above low temperature region, the target voltage Vset is the high target voltage VsetH (14.5 V).

As shown in FIG. 3, in this intermediate temperature region, the comparator 15 more frequently outputs the low-level signal Lo. Finally, the on-duty ratio of the excitation current control voltage Vs decreases for a relatively long time, compared with the control without the low target voltage VsetL (13V).

(In High Temperature Region)

In FIG. 3, this high temperature region is depicted as a time region Tb which is defined after a timing point t2.

In this case where the detected temperature TVT of the power switching component 22 is relatively high, specifically, higher than the higher-control temperature TPH (corresponding to the high reference voltage VrefH), the comparator 12 outputs the high-level signal. Consequently, the following sequence operations occur in the circuits 14, 15, 16, 17. First, the limiter 14 outputs the low target voltage VsetL (13V). Second, the comparator 15 outputs the high (Hi) or low (Lo) signal according to whether the battery voltage VB is lower or higher than the low target voltage VsetL, respectively. Third, the up/down counter 16 outputs the up or down count signal according to whether the battery voltage VB is lower or higher than the low target voltage VsetL (13V), respectively. Fourth, the PWM signal generating circuit 17 generates and outputs a PWM signal having the high or low on-duty ratio according to the up or down count signal, respectively. Resultantly, the battery voltage VB converges to the low target voltage VsetL (13V).

In this way, as shown in FIG. 3, when the battery voltage VB is regulated from 14.5V to 13V by decreasing the on-duty ratio of the control signal Vs based on the detected-temperature increase, the battery voltage VB can be lowered smoothly. Resultantly, the torque change imposed on the engine for driving the alternator smoothly changes, so that the torque shock is concurrently well suppressed, with effectively suppressing the temperature increase of the power switching component.

This advantage results from the reverse hysteresis setting method of the control temperatures, that is, the deactivating temperature TPH is set higher than the activating temperature TPL.

It will be appreciated that the present invention is not limited to the configurations described above, but any and all modifications, variations or equivalents, which may occur to those who are skilled in the art, should be considered to fall within the scope of the present invention.

What is claimed is:

1. A thermal protecting circuit for a controller of an alternator, the thermal protecting circuit comprising:
   a switching member for controlling an amount of power to be applied to the alternator according to an on-duty ratio of the switching member;
   a sensor sensing a temperature of the switching member; and
   a control circuit configured to:
      reduce the on-duty ratio of the switching member when the temperature of the switching member sensed by the sensor is changed from a first temperature range to a second temperature range that is higher than the first temperature range; and
      further lower the reduced on-duty ratio of the switching member when the temperature of the switching member sensed by the sensor is changed from the second temperature range to a third temperature range that is higher than the second temperature range.

2. The thermal protecting circuit of claim 1, further comprising a switching circuit comprising the switching member and a circular diode connected between an output terminal of the alternator and a terminal of the switching member,
   wherein the sensor senses a temperature of the switching circuit as the temperature of the switching member.

3. The thermal protecting circuit of claim 1, wherein the first temperature range and the second temperature range are contiguous to each other via a first predetermined temperature, the second temperature range and the third temperature range are contiguous to each other via a second predetermined temperature, and the second predetermined temperature is substantially equal to an upper limit of the second temperature range within which the switching member is able to operate without malfunction.

4. The thermal protecting circuit of claim 1, wherein a first predetermined temperature and a second predetermined temperature are each set so that the temperature of the switching member sensed by the sensor is maintained by the thermal protecting circuit between the first and second predetermined temperatures when an ambient temperature around the switching member and a heat generated by the switching member are an expected maximum temperature and an expected maximum heat, respectively.

5. The thermal protecting circuit of claim 1, wherein
   the first temperature range and the second temperature range are contiguous to each other via a first predetermined temperature, the second temperature range and the third temperature range are contiguous to each other via a second predetermined temperature, and
   the control circuit is further configured to:
      substantially lower the on-duty ratio of the switching member when the temperature of the switching circuit sensed by the sensor exceeds the first predetermined temperature, and
      substantially raise the on-duty ratio of the switching member when the temperature of the switching circuit sensed by the sensor is lower than the second predetermined temperature.

6. The thermal protecting circuit of claim 1, further comprising an excitation current control circuit that controls an excitation current of the alternator.

7. The thermal protecting circuit of claim 6, wherein
   the first temperature range and the second temperature range are contiguous to each other via a first predetermined temperature, the second temperature range and the third temperature range are contiguous to each other via a second predetermined temperature,
   the control circuit performs a feedback control when the temperature of the switching member sensed by the sensor is within the second temperature range so as to substantially lower the on-duty ratio when a battery voltage exceeds a predetermined voltage and substantially raise the on-duty ratio when the battery voltage is lower than the predetermined voltage, and the predetermined voltage being lowered when the temperature of the switching member sensed by the sensor exceeds the first predetermined temperature, while also raising the predetermined voltage when the temperature of the switching member sensed by the sensor is lower than the second predetermined temperature.

8. The thermal protecting circuit of claim 7, wherein the control circuit turns off the switching member based on the on-duty ratio of the switching member to thereby perform thermal protection of the switching member while the control circuit turns on the switching member based on the on-duty ratio of the switching member to thereby release the thermal protection of the switching member.

9. The thermal protecting circuit of claim 8, wherein the switching member is Pulse-Wave-Modulation (PWM) controlled.

* * * * *